United States Patent
Udipi et al.

(10) Patent No.: US 11,330,399 B2
(45) Date of Patent: May 10, 2022

(54) ANOMALY PREDICTOR FOR PHYSICAL SAFETY OF GROUP MEMBERS

(71) Applicant: Microsoft Technology Licensing, LLC, Redmond, WA (US)

(72) Inventors: Rahul Anantha Padmanabha Udipi, Cupertino, CA (US); Christopher Yu, San Francisco, CA (US); Maxon Reave Wheeler, Los Gatos, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/860,474

(22) Filed: Apr. 28, 2020

(65) Prior Publication Data

US 2021/0337352 A1  Oct. 28, 2021

(51) Int. Cl.
*H04W 4/029* (2018.01)
*G06Q 10/10* (2012.01)
(Continued)

(52) U.S. Cl.
CPC .......... *H04W 4/029* (2018.02); *G06Q 10/107* (2013.01); *G06Q 10/109* (2013.01);
(Continued)

(58) Field of Classification Search
CPC ....... H04W 4/029; H04W 4/021; H04W 4/02; H04W 64/003; H04M 1/72457;
(Continued)

(56) References Cited

U.S. PATENT DOCUMENTS 9,927,252 B1  3/2018 Chokshi et al.
9,947,052 B1  4/2018 Slusar et al.
(Continued)

FOREIGN PATENT DOCUMENTS

| CN | 202475487 U | 10/2012 |
|---|---|---|
| CN | 104539304 A | 4/2015 |
| CN | 205353941 U | 6/2016 |

OTHER PUBLICATIONS

"International Search Report & Written Opinion issued in PCT Application No. PCT/US21/020972", dated May 19, 2021, 13 Pages.
(Continued)

*Primary Examiner* — Quoc Thai N Vu

(57) ABSTRACT

In non-limiting examples of the present disclosure, systems, methods and devices for surfacing alerts are provided. A monitoring service may monitor a plurality of devices associated with a group. The group may include a plurality of accounts. Each account may be associated with a different location control list. The location control list may include locational information comprising geocoordinates of locations that a corresponding user is approved to visit and temporal information corresponding to times, days of the week, and/or dates when a corresponding user is approved to visit a location. If a determination is made that a device associated with an account is at a location that is not included in a location control list for the account, an anomaly alert may be surfaced on one or more devices associated with other group members. The alert may be surfaced in association with a safety score for the location.

20 Claims, 12 Drawing Sheets

(51) Int. Cl.
  *H04L 29/06* (2006.01)
  *H04L 67/52* (2022.01)
  *H04L 67/306* (2022.01)
  *H04W 4/021* (2018.01)

(52) U.S. Cl.
  CPC .............. *H04L 63/08* (2013.01); *H04L 67/18* (2013.01); *H04L 67/306* (2013.01); *H04W 4/021* (2013.01)

(58) Field of Classification Search
  CPC ......... H04M 1/72451; H04M 2242/14; H04M 2242/28; H04L 63/08; H04L 67/18; H04L 67/306; H04L 67/22; G06Q 10/107; G06Q 10/109
  See application file for complete search history.

(56) References Cited

U.S. PATENT DOCUMENTS

| | | | |
|---|---|---|---|
| 10,036,644 B2 | 7/2018 | Chokshi et al. | |
| 10,096,038 B2 | 10/2018 | Ramirez et al. | |
| 10,157,422 B2 | 12/2018 | Peters et al. | |
| 10,209,085 B2 | 2/2019 | Chokshi et al. | |
| 10,395,526 B1 | 8/2019 | Slusar | |
| 10,460,600 B2 | 10/2019 | Julian et al. | |
| 10,563,994 B2 | 2/2020 | Chokshi et al. | |
| 11,037,247 B2 | 6/2021 | Bogovich et al. | |
| 11,062,341 B2 | 7/2021 | Ramirez et al. | |
| 11,118,923 B2 | 9/2021 | Chintakindi et al. | |
| 11,150,100 B2 | 10/2021 | Chokshi et al. | |
| 2011/0213628 A1 | 9/2011 | Peak et al. | |
| 2011/0282627 A1 | 11/2011 | Jang et al. | |
| 2012/0123806 A1 | 5/2012 | Schumann et al. | |
| 2014/0074873 A1* | 3/2014 | Ngo .................. G06F 16/9537 707/758 |
| 2016/0086285 A1 | 3/2016 | Peters et al. | |
| 2016/0171521 A1 | 6/2016 | Ramirez et al. | |
| 2017/0083821 A1* | 3/2017 | Foerster ............ G01C 21/3617 |
| 2017/0191847 A1 | 7/2017 | Chintakindi et al. | |
| 2018/0164112 A1 | 6/2018 | Chintakindi et al. | |
| 2018/0180430 A1 | 6/2018 | Chokshi et al. | |
| 2018/0219759 A1* | 8/2018 | Brown .................. H04L 67/18 |
| 2018/0252543 A1 | 9/2018 | Chokshi et al. | |
| 2018/0374113 A1 | 12/2018 | Ramirez et al. | |
| 2019/0028288 A1* | 1/2019 | Keil ...................... H04L 67/26 |
| 2019/0066223 A1 | 2/2019 | Bogovich et al. | |
| 2019/0101914 A1 | 4/2019 | Coleman et al. | |
| 2019/0163973 A1* | 5/2019 | Keohane ............ G06K 9/6271 |
| 2019/0170525 A1 | 6/2019 | Chokshi et al. | |
| 2019/0301877 A1 | 10/2019 | Duale et al. | |
| 2020/0173799 A1 | 6/2020 | Chokshi et al. | |
| 2021/0331668 A1 | 10/2021 | Udipi et al. | |

OTHER PUBLICATIONS

"International Search Report & Written Opinion issued in PCT Application No. PCT/US21/022448", dated Jun. 1, 2021, 11 Pages.
"Non Final Office Action Issued in U.S. Appl. No. 16/860,576", dated Nov. 23, 2021, 38 Pages.

* cited by examiner

US 11,330,399 B2

ANOMALY PREDICTOR FOR PHYSICAL SAFETY OF GROUP MEMBERS

BACKGROUND

Tightly knit groups, such as families, with multiple computing devices may utilize one or more services to help them regulate which applications may be used by certain group members (e.g., children) and how much time can be spent accessing various content on the computing devices. For example, an adult member of a family group may wish to limit a child's access to certain applications, the amount of time that the child spends playing various games on a computing device, or the amount of time that the child spends on certain websites. However, while these types of group services are useful in allowing administrator users (e.g., adult users) to regulate device and application use, they typically do not provide ways of regulating or tracking real-world actions of group members.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for surfacing locational anomaly alerts in relation to a group of users and their computing devices. A group device monitoring service may monitor location information for computing devices associated with user accounts of a group (e.g., a family group). The group device monitoring service may maintain a location control list for each of the user accounts. The location control list may include location information for locations that each user of the group may visit without an anomaly alert being generated. The location information may also be associated with temporal information (e.g., times, days of the week, dates) that each location may be visited without an anomaly alert being generated. In some examples, the location information for a user account may be established and added to a location control list based on pattern behavior of a user. In other examples, the location information for a user account may be established and added to a location control list based on manual input from a user. If a user is determined to be at a location that is not in the location control list for the user, an anomaly alert may be surfaced on a computing device of one or more other group members. Similarly, if a user is determined to be at a location that is in the location control list for the user, but the time when the user is at the location is not included in the location control list for the user, an anomaly alert may be surfaced on a computing device of one or more other group members. In some examples, an anomaly alert may be surfaced with an indication of a safety score for a location corresponding to a user's location.

BRIEF DESCRIPTION OF THE DRAWINGS

Non-limiting and non-exhaustive examples are described with reference to the following figures:

FIG. 2 illustrates a computing environment for processing data from various software applications and identifying new location events for augmenting a location control list with.

DETAILED DESCRIPTION

Figure 1:
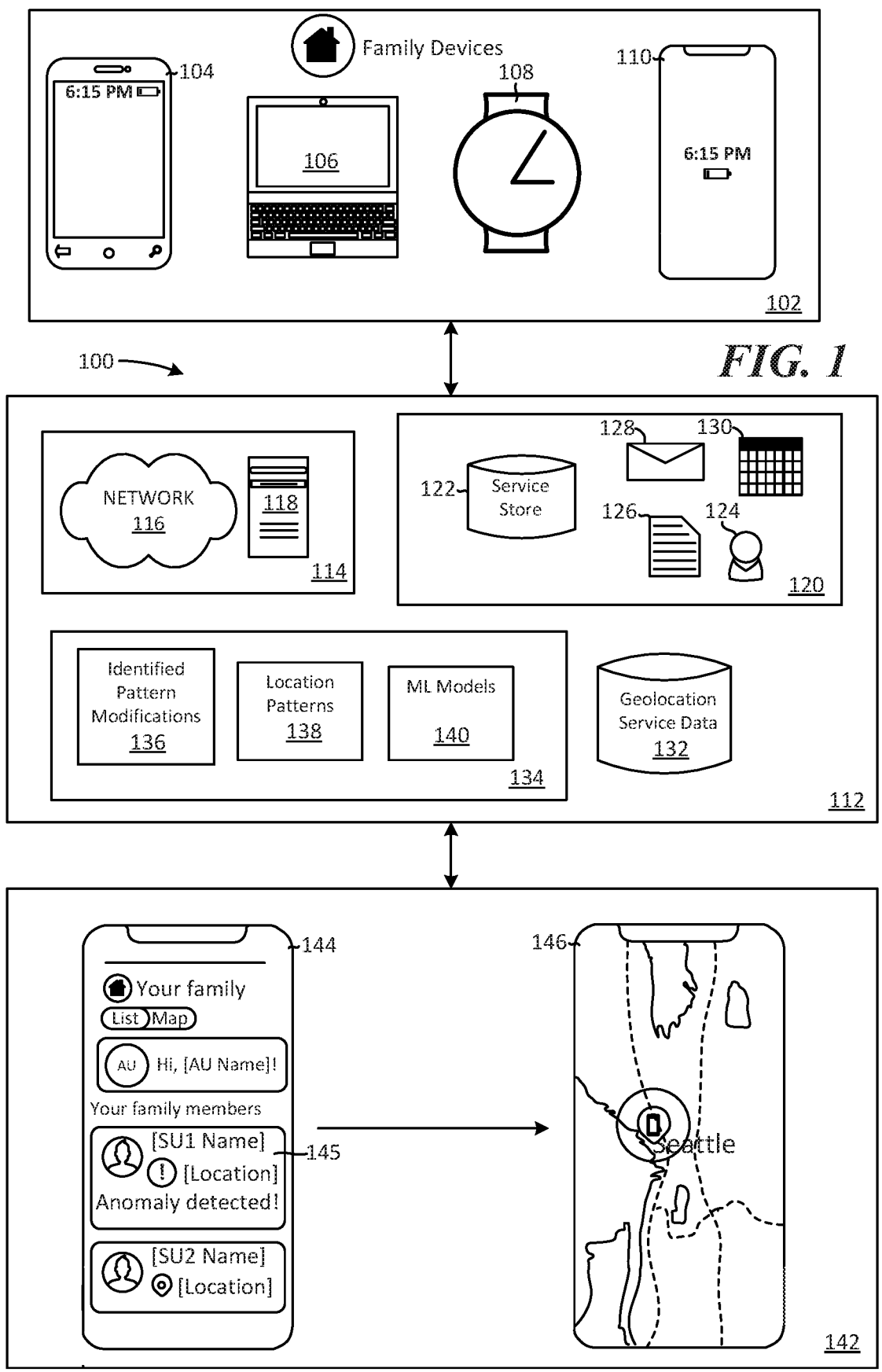
FIG. 1 is a schematic diagram illustrating an example distributed computing environment for surfacing alerts associated with locational anomalies in relation to a group device monitoring service.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Non-limiting examples of the present disclosure describe systems, methods and devices for surfacing locational anomaly alerts in relation to a group of users and their computing devices. A group device monitoring service may associate a plurality of user accounts and computing devices with one another. For example, a first user account may create a group with the group device monitoring service. The group may comprise a plurality of user accounts and a plurality of computing devices. The first user account may be designated by the group device monitoring service as an administrator user account. The administrator user account may have administrative controls and permissions in relation one or more secondary user accounts for the group. The administrative controls and permissions may relate to device usage, application usage, and/or device location. In some examples, the administrator user account may designate one or more user accounts of the group as co-administrator accounts that also have administrative controls and permissions in relation to one or more secondary user accounts for the group.

The group device monitoring service may provide locational information about computing devices associated with one or more other user accounts of a group to an administrator user account of the group. In some examples, the administrator user account may allow secondary user accounts to receive locational information about administrator computing devices. The group device monitoring service may maintain a location control list for each user account of a group. A location control list may include identities (e.g., names, location types) and geolocation coordinates for locations that are approved for a user to be at. In other examples, a location control list may include identities and geolocation coordinates for locations that a user has visited a threshold number of times and/or a threshold number of times over a threshold duration of time. In still additional examples, a location control list may associate times, days of the week, and/or dates with the locations in a location control list. Those times, days of the week, and/or dates may be approved temporal parameters for a user of a group to visit those locations and/or they may comprise temporal patterns when a user of a group typically visits those locations.

In some examples, the group device monitoring service may receive locational information for computing devices associated with a group. The group device monitoring service may determine whether geolocation coordinates for a computing device associated with a group user account match a location included in a location control list for that user account. In some examples, the group device monitoring service may also determine whether a time, day of the week, and/or date corresponding to the time the computing device is at a location is included in the location control list for that specific location. If the location and/or the time, day of the week, and/or date is not included in the location control list, the group device monitoring service may cause an alert to be surfaced on a computing device associated with one or more other user accounts of the group. In some examples, the alert may include a safety score for the location corresponding to the anomaly. The safety score may be obtained from a crime service that is distinct from the group device monitoring service. In other examples, the safety score may be generated by the group device monitoring service from historical crime data obtained from one or more sources and/or data stores.

The systems, methods, and devices described herein provide technical advantages for providing anomaly alerts related to user groups. Processing costs associated with determining where group members are located are reduced in that a first user does not need to enter a phone application or messaging application to contact a second user to determine where the first user is located. Further, the first user does not have to enter and search a map application to determine where a second user's location is. Rather, the mechanisms described herein may only provide anomaly alerts to group members when a user is at a location that is not included in a location control list for that user's account, or when a user is at a location at a time that is not included in a location control list for that user's account.

FIG. 1 is a schematic diagram illustrating an example distributed computing environment 100 for surfacing alerts associated with locational anomalies in relation to a group device monitoring service. Computing environment 100 includes family devices sub-environment 102, group monitoring service sub-environment 112, and anomaly alert sub-environment 142.

Family devices sub-environment 102 includes tablet computing device 104, laptop computing device 106, smartwatch computing device 108, and smartphone computing device 110. In this example, each of the devices illustrated in family devices sub-environment 102 belong to members of a family and are associated with a group device monitoring service via a family account. However, it should be understood that computing devices may be associated with the group device monitoring service via a generic group account and devices need not necessarily be associated with family members.

Group monitoring service sub-environment 112 includes network and processing sub-environment 114, service store sub-environment 120, geolocation service data store 132, and group device monitoring elements 134. Network and processing sub-environment 114 includes network 116, via which any and all of the computing devices described herein may communicate with one another, and server computing device 118. Server computing device 118 is illustrative of one or more server computing devices that may host a group device monitoring service.

The group device monitoring service may be associated with a group. The group may include a plurality of user accounts, and each of the plurality of user accounts may be associated with one or more computing devices. The group may include one or more administrator accounts and one or more secondary accounts. In some examples, the administrator accounts may be associated with parent users of a family group, and the secondary accounts may be associated with child users of a family group. The administrator accounts may control settings which approve or deny locations that secondary account users may visit, times at which secondary account users may visit locations, days of the week that secondary account users may visit locations, and/or dates on which secondary account users may visit locations. That is, if a secondary account user is determined to be at a location that has not been approved, or a secondary account user is determined to be at a location that is approved, but the user is at the location at an unapproved time or day, the group device monitoring service may cause an anomaly alert to be surfaced on one or more computing devices associated with an administrator account.

In examples, one or more user accounts of a group may be associated with a location control list of the group device monitoring service. A location control list includes information about locations that group users are approved to visit. A location control list may be associated with one or more computing devices of a user account that the location control list relates to. For example, if a location control list relates to a first user account, that location control list may include identifying information (IP addresses, device IDs) for one or more computing devices associated with the first user account. A location control list may further include a plurality of location entries. A location entry for a location may include identifying information (e.g., location name, location type) for the location, geocoordinates for the location, times when a corresponding user is approved to be at the location, days when the corresponding user is approved to be at the location, and/or dates when the corresponding user is approved to be at the location.

An administrator user of a group may determine which locations, times, days, and dates are added to a location control list for a secondary user. In some examples, an administrator user may manually approve locations, times, days, and dates that are approved for a secondary user and that should therefore be associated with a location entry in the secondary user's location control list. In additional examples, an administrator user may be prompted to add or deny entry of a new location (or times associated with visiting the new location) to a location control list for a secondary user when the secondary user is determined to be at a location that is not already included in the secondary user's location control list or if the times associated with visiting an existing location are not included in the secondary user's location control list. In still additional examples, an administrator user may manually adjust a setting for a secondary user that allows the group device monitoring service to automatically add a new location, and/or times associated with visiting a new location, to a location control list for a secondary user if the secondary user has been determined to visit that location a threshold number of times and/or a threshold number of times at a specific time and/or day. In other examples, an administrator may manually adjust a setting for a secondary user that allows the group device monitoring service to automatically add a new location, and/or times associated with visiting a new location, to a location control list for a secondary user if the secondary user has been determined to visit that location with a threshold frequency (e.g., threshold number of times over X days, threshold number of times over Y weeks), and/or a threshold frequency at a specific time and/or day. In some examples, the group device monitoring service may automatically add a location entry for a new location to a location control list for a secondary user account if the group device monitoring service has provided an anomaly alert to an administrator user account and that alert has been dismissed one or more times.

In some examples, a secondary account user may be approved to be at any location while they are accompanied by an administrator account user of the same group. For example, although a location may not be included in a location control list for a secondary user account, and the secondary user associated with that secondary user account may be determined to be at that location, an anomaly alert may nonetheless not be surfaced if the secondary user is determined to be within a threshold distance of an administrator user of the group while at that location.

Service store sub-environment 120 may include information associated with the group device monitoring service and/or one or more productivity application services. For example, service store sub-environment may include one or more location control lists, one or more group identities and settings for a group monitored by the group device monitoring service, and/or content associated with one or more additional applications. This information may be saved in service store 122. In some examples, service store 122 may be associated with a plurality of user accounts, such as user account 124. User account 124 may be associated with a group monitored by the group device monitoring service. User account 124 may additionally or alternatively be associated with one or more productivity application services. In this example, user account 124 is associated with an email application service, a word processing application service, and a calendar application service. As such, service store 122 includes email messages 128 associated with user account 124, documents 126 associated with user account 124, and calendar information 130 associated with user account 124. Service store 122 may include additional information from one or more other applications, such as SMS messaging applications, group messaging/collaboration applications, task management applications, to-do list applications, map applications, reservation applications, presentation applications, and spreadsheet applications, for example.

Geolocation service data store 132 may include geolocation data associated with one or more parameters. For example, geolocation service data store 132 may include a list of geocoordinates, entities that are present at those geocoordinates, types of those entities, hours of operation for those entities, IP addresses associated with geocoordinates, boundaries and/or geofences for specific areas included in the geocoordinates, and/or crime data for areas. In some examples, when a computing device associated with a group is active, the group device monitoring service may determine geolocation coordinates for a location where a computing device is currently active. Those coordinates may be provided to geolocation service data store 132, which may match the coordinates to one or more locations, entities, location types, and/or crime data. The geocoordinates for an active device may be identified via cellular data, GPS data, and/or WiFi data, for example.

Group device monitoring elements 134 include identified pattern modifications element 136, location patterns element 138, and machine learning models 140. Location patterns element 138 may include locational history associated with one or more user accounts and presence at one or more locations. Identified pattern modifications element 136 may include locational history associated with user/device presence at one or more locations that are not included in a location control list for a user, but for which those locations have been approved based on analysis of one or more pieces of data. The one or more pieces of data may include calendar events associated with a user account of a group that includes the user account for the corresponding user, emails associated with a user account of a group that includes the user account for the corresponding user, and/or SMS messages for a user account of a group that includes the user account for the corresponding user, for example.

Machine learning models 140 may include one or more machine learning models that have been trained to identify one or more words or sentences (e.g., from calendar events, emails, SMS messages) that are relevant to a "visit location" intent. Machine learning models 140 may include one or more word and/or sentence embedding layers (e.g., Word2Vec, BERT, Sent2Vec, Embeddings from Language Models (ELMo), recurrent neural network). Machine learning models 140 may further include a sentence level information aggregation layer for aggregating embeddings from each word in a natural language input into a distinct embedding for one or more sentences included in a natural language input. The distinct sentence aggregation layer may apply a neural network to the embeddings for each word. In examples, the neural network may comprise a gated recurrent unit (GRU) neural network or bidirectional GRU (bi-GRU) neural network. In other examples the neural network may comprise a long short-term member (LSTM) neural network, an attention-based aggregation method, etc. Machine learning models 140 may further include a contextual aggregation layer for aggregating each distinct embedding for each of the sentences into a contextual embedding. In aggregating the distinct embeddings for each sentence, the contextual aggregation layer may apply a neural network to each distinct embedding for each of the sentences. In examples, the neural network may comprise a GRU neural network, or bi-GRU neural network. In other examples, the neural network may comprise an LSTM neural network, an attention-based aggregation method, etc.

Machine learning models 140 may further comprise a scoring layer for scoring and ranking one or more sentences or one or more words based on their relevance to a visit location intent. In scoring and ranking one or more words, the scoring layer may apply a classifier function to an embedding (e.g., embeddings generated by the contextual aggregation layer). In examples, the classifier function may comprise a sigmoid function. Other activation functions (e.g., tan h, softplus) may be utilized for scoring an embedding.

In this example, computing device 110 in family device sub-environment 102 is the same computing device as computing device 144 and computing device 146 in anomaly alert sub-environment 142. Computing device 110 is associated with an administrator account of a group managed by the group device monitoring service. The administrator user is [AU Name]. Computing device 104, computing device 106, and computing device 108 may be associated with secondary users of the group managed by the group device monitoring service. In this example, a secondary user of the group has been identified as being currently located at a location that is not included in a location entry for a location control list for that user. For example, the secondary user may be wearing computing device 108, geocoordinates for computing device 108 may be identified, the geocoordinates may be matched to a location in geolocation service data store 132, and the identity of that location may not be included in a location entry for a location control list for the secondary user. As such, alert 145 may be caused to be displayed on computing device 144.

Alert 145 is surfaced in a "your family" application executed all or in part by computing device 144. However, alert 145 may be surfaced in a different manner (e.g., via a pop-up notification, in a different application, etc.). Alert 145 displays the name of the secondary user "[SU1 Name]", the location where the secondary user has been identified as currently being located "[Location]", and an indication that there is an anomaly detected (e.g., that the secondary user is not at a location included in a location entry for that user's location control list). Computing device 144 and the user interface for the "your family" application also includes the last known location of another secondary user "[SU2 Name]" of the group, and a selectable element for viewing a map view of one or more members of the group. In this example, a selection is made of the selectable element, and the user interface for the map view is caused to be displayed as illustrated by computing device 146. For example, the current location of the computing device associated with secondary user "[SU1 Name]" may be surfaced on the map displayed by computing device 146.

Figure 2:
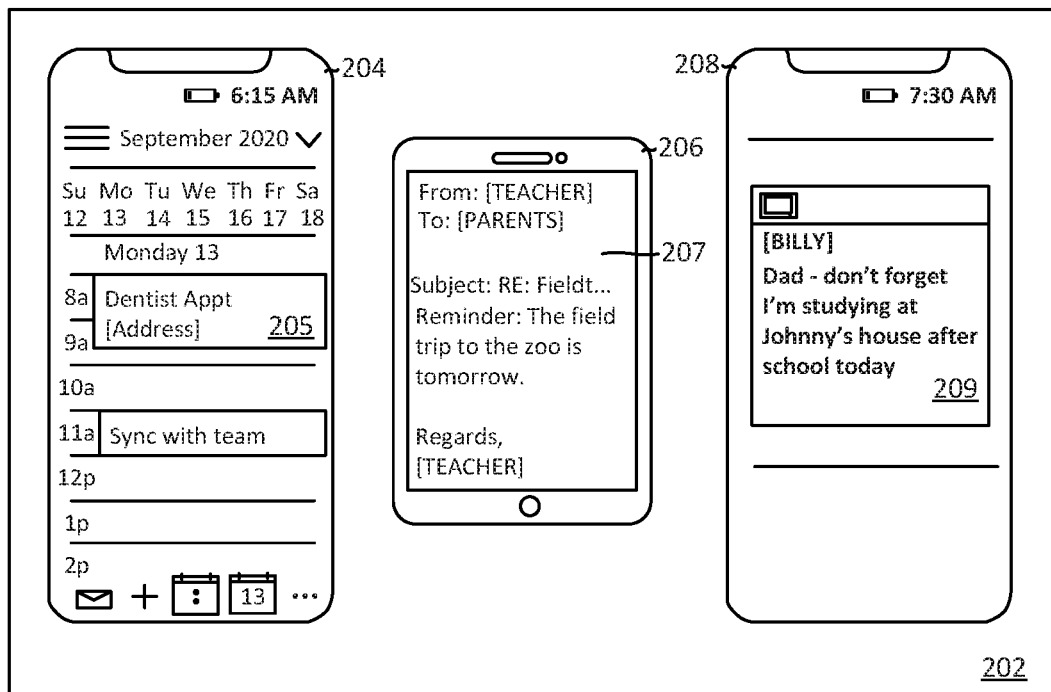
Figure 2:
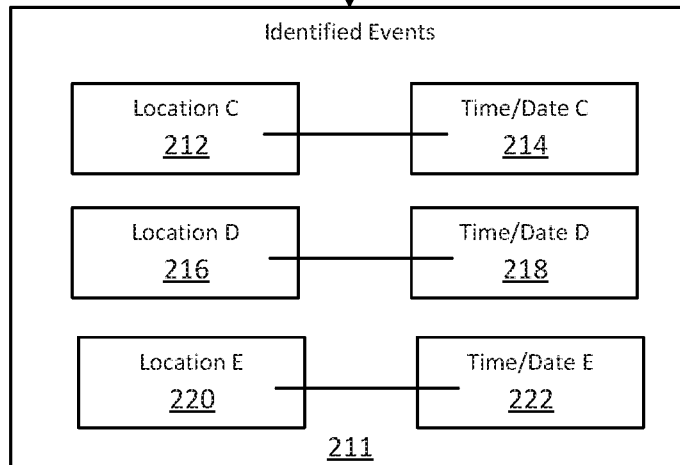

FIG. 2 illustrates a computing environment 200 for processing data from various software applications and identifying new location events for augmenting a location control list with. Computing environment 200 includes application sub-environment 202, event identification engine 210, identified events sub-environment 211, and location control list augmentation engine 224.

Application sub-environment 202 includes computing device 204, computing device 206, and computing device 208. Each of the computing device in application sub-environment 202 are associated with at least one user account of a group that is monitored by the group device monitoring service. One or more of the devices included in application sub-environment 202 may be associated with an administrator user of the group and/or one or more of the devices included in application sub-environment 202 may be associated with a secondary user of the group. Data from applications and/or services accessed via one of the devices in application sub-environment 202 may be analyzed by event identification engine 210. Event identification engine 210 may reside on a client computing device such as, computing device 204, computing device 206, and computing device 208. In other examples, event identification engine 210 may reside on one or more cloud-based computing devices. Event identification engine 210 may be incorporated in the group device monitoring service. In some examples, an administrator of a group that the group device monitoring service monitors may provide event identification engine 210 with access to data from applications and or services accessed from computing devices associated with the group.

Event identification engine 210 may identify locational events associated with a first user account of a group from data generated by and/or received by a computing device associated with that first user account. For example, event identification engine 210 may identify a new locational event associated with a secondary user (e.g., child user A of group A) from data received or generated by a calendar application associated with the secondary user (e.g., child user A of group A). In other examples, event identification engine 210 may identify locational events associated with a first user account of a group from data generated by and/or received by a computing device associated with a different user account. For example, event identification engine 210 may identify a new locational event associated with a secondary user (e.g., child user A of group A) from data received or generated by an email application associated with an administrator user (e.g., parent user A of group A).

In this example, computing device 204 displays a calendar application. Specifically, computing device 204 displays calendar information for a user account associated with a group monitored by the group device monitoring service. That information includes events scheduled for Monday the 13th of September 2020. In this example, event identification engine 210 may analyze event 205 corresponding to "Dentist Appt". Event identification engine 210 may automatically determine that there is a location event associated with event 205 because there is a physical location associated with it ("[Address]"). As such, event identification engine 210 extracts that location as illustrated by location C 212 as well as the time and date associated with it as illustrated by Time/Date C 214 in identified events sub-environment 211.

Computing device 206 displays an email application. Specifically, computing device 206 displays email 207 from a teacher to an administrator user account (e.g., a parent user account) associated with a group monitored by the group device monitoring service. Email 207 states "Reminder: The field trip to the zoo is tomorrow. Regards, [TEACHER]". Event identification engine 210 may analyze (e.g., apply one or more language processing models) email 207 and determine that there is a location event associated with it. Event identification engine 210 may analyze one or more previous emails and determine an exact location of the zoo or it may query a geolocation service and identify one or more zoos in the area where the group is located. Additionally, event identification engine 210 may analyze one or more previous emails and determine an exact time for the field trip the next day. As such, event identification engine 210 extracts the location for the zoo as illustrated by location D 216 as well as the time and date associated with the field trip as illustrated by Time/Date D 218 in identified events sub-environment 211.

Computing device 208 displays SMS message 209, which was sent by a secondary user account ("Billy"—a child) associated with a group monitored by the group device monitoring service to an administrator user account ("Dad"—a parent) associated with the group. Message 209 states "Dad—don't forget I'm studying at Johnny's house after school today". Event identification engine 210 may analyze (e.g., apply one or more language processing models) message 209 and determine that there is a location event associated with it. Event identification engine 210 may analyze one or more previous texts, emails, and/or contact information from a contacts application to determine an exact location for "Johnny's house". Additionally, event identification engine 210 may analyze one or more previous texts, emails, and/or location information associated with Billy's school (e.g., information included in a geolocation service, information identified from a web search engine) to determine what time "after school" corresponds to. As such, event identification engine 210 extracts the location for "Johnny's house" as illustrated by location E 220 as well as the time and date associated with the study session as illustrated by Time/Date E 222 in identified events sub-environment 211.

Location control list augmentation engine 224 may take the data identified via event identification engine 210 (e.g., location C 212, time/date C 214; location D 216, time/date D 218; location E 220, time/date E 222), and add each corresponding locational event as a locational entry to the location control list for the secondary user. The additions to the location control list may be only for the date/times that were identified, or they may be repeating. Thus, when a determination is made that the secondary user (e.g., Billy in this example) is at the Dentist on Monday September 13, 2020 at 8 am, there will be no anomaly alert that is issued to a device associated with an administrator user of the group. When a determination is made that the secondary user is at the zoo the day following the receiving of email 207, there will be no anomaly alert that is issued to a device associated with an administrator user of the group. When a determination is made that the secondary user is at Johnny's house at a time corresponding to "after school" on the day SMS message 209 is received, there will be no anomaly alert that is issued to a device associated with an administrator user of the group.

Additional details regarding location control list augmentation engine 224 are provided below in relation to FIG. 3.

Figure 3:
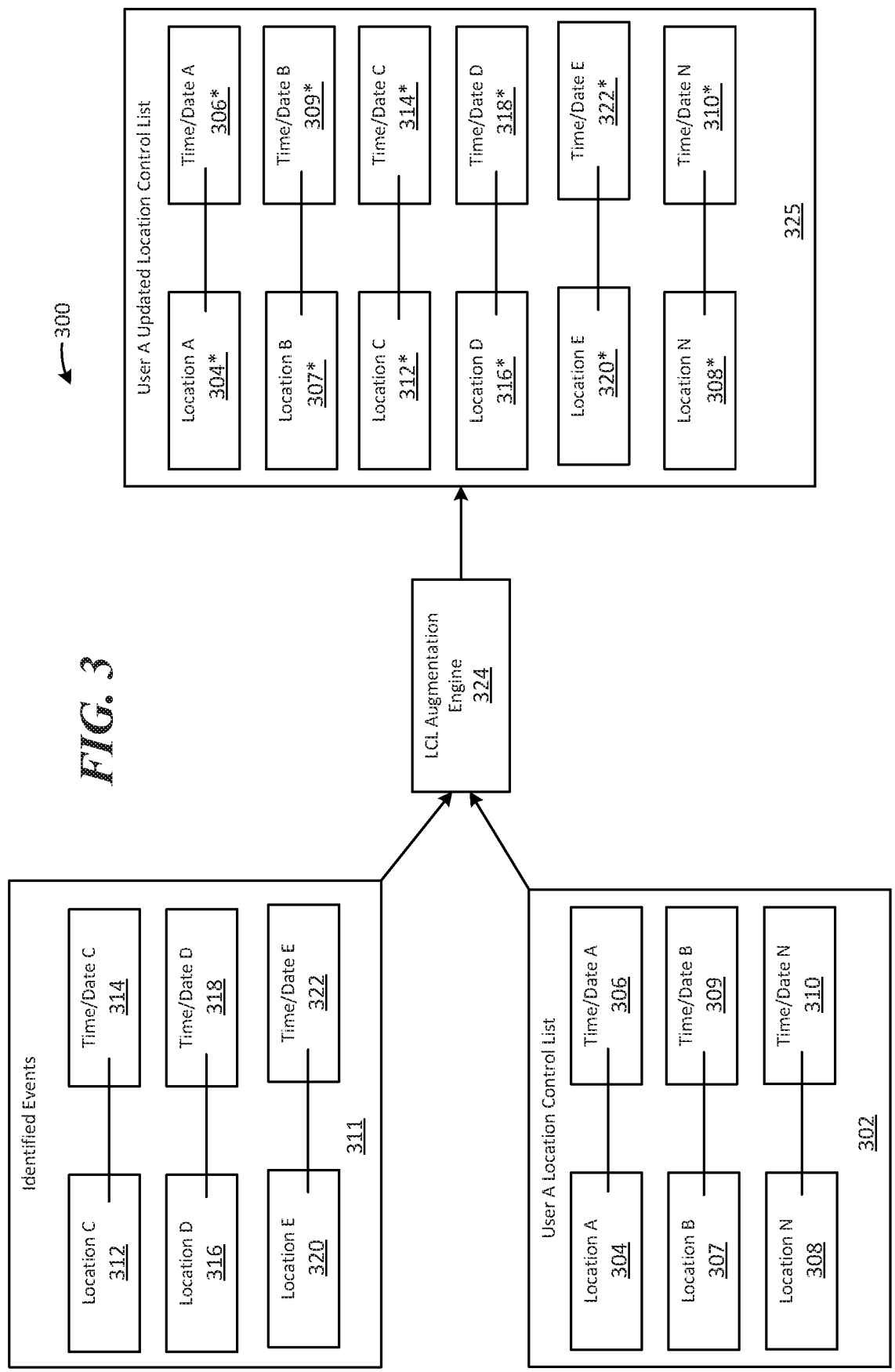
FIG. 3 illustrates a simplified block diagram for augmenting a location control list for a group device monitoring service with newly identified location event information.

FIG. 3 illustrates a simplified block diagram 300 for augmenting a location control list for a group device monitoring service with newly identified location event information. Block diagram 300 includes identified events 311, which are the same identified events as identified events 211 in FIG. 2. Block diagram 300 also includes user A location control list 302, which includes location control list information for a secondary user account managed by the group device monitoring service. Block diagram 300 also includes location control augmentation engine 324 and user A updated location control list 325.

Identified events 311 includes location C 312 and corresponding time/date C 314, location D 316 and corresponding time/date D 318, and location E 320 and corresponding time/date E 322.

User A location control list 302 is the location control list for a secondary user account monitored by the group device monitoring service. Specifically, user A location control list 302 corresponds to the location control list for the secondary user (Billy) from FIG. 2. The location control list includes information for locational events that were approved for that secondary user account prior to the identification of the location events illustrated in identified events 311. In examples, the locations in a location control list need not be manually approved. Rather, they may be added to a location control list based on identified patterned behavior. In other examples, the location control list may need to be manually approved by an administrator user. User A location control list 302 includes location A 304 and corresponding time/date A 306, location B 307 and corresponding time/date B 309, and location N 308 and corresponding time/date N 310. Each of the locational events (e.g., locations and corresponding times/dates) in user A location control list 302 are illustrative of locations and times that the secondary user account may be identified as being present at, which the group device monitoring service would not provide an anomaly alert for.

Location control augmentation engine 324 takes the data from identified events 311 and combines them with the information for locational events in the pre-existing location control list (user A location control list 302) for the secondary user account. Thus, the updated location control list for the secondary user account after augmentation by location control list augmentation engine 324 is illustrated by user A updated location control list 325.

User A updated location control list 325 includes the locational event information that was included in user A location control list 302. Specifically, user A updated location control list 325 includes location A 304* and corresponding time/date A 306*, location B 307* and corresponding time/date B 309*, and location N 308* and corresponding time/date N 310*. Additionally, user A location control list 302 includes locational event information that was identified from automated analysis (e.g., application of machine learning models, application of language processing models) of application data associated with one or more user accounts monitored by the group device monitoring service. Specifically, user A location control list 302 includes the locational event data from identified events 311, comprising: location C 312* and corresponding time/date 314*, location D 316* and corresponding time/date D 318*, and location E 320* and corresponding time/date E 322*.

Figure 4:
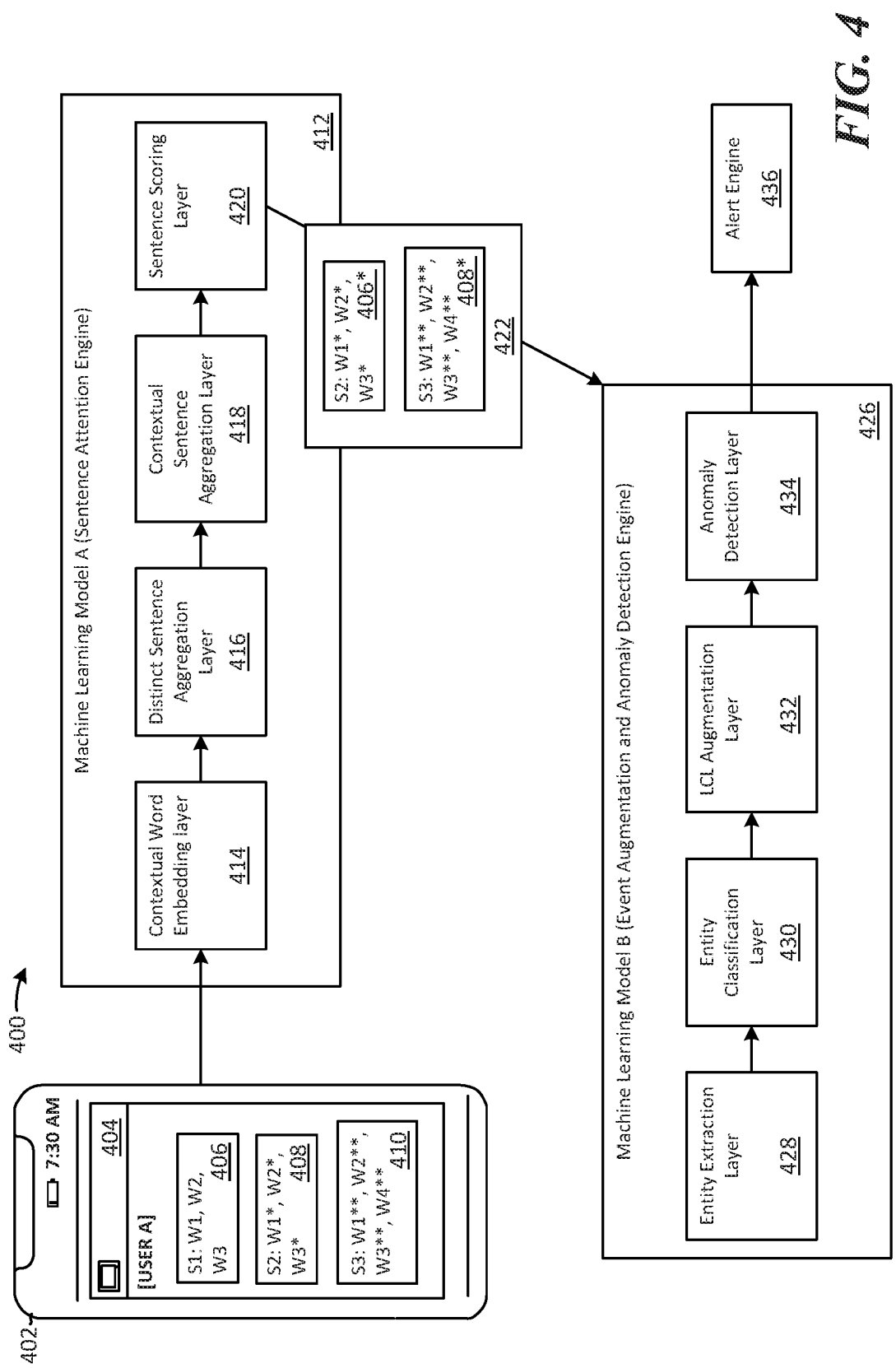
FIG. 4 illustrates a simplified block diagram for processing natural language from a software application to identify new location events.

FIG. 4 illustrates a simplified block diagram 400 for processing natural language from a software application to identify new location events. Although diagram 400 illustrates the processing of natural language from a series of SMS messages, it should be understood that the described processing can be performed on natural language from various sources. For example, the processing could be performed on emails, productivity application documents, calendar events, group messaging chats, transcribed telephone conversations, and transcribed voicemails, for example.

Diagram 400 includes smart phone computing device 402, machine learning model A 412, machine learning model B 426, extracted strings 422, and alert engine 436. Machine learning model A 412 includes contextual word embedding layer 414, distinct sentence aggregation layer 416, contextual sentence aggregation layer 418, and sentence scoring layer 420. Machine learning model A 412 receives sentences (or sentence fragments) from a natural language input, such as from messages 404. In this example, machine learning model A 412 receives language input from messages 404, which include message one 406, message two 408, and message three 410. In some examples, machine learning model A 412 may process entire messages individually. In other examples, if a message is over a threshold number of words, it may be separated into strings for processing. In still other examples, if a message includes sentences, each sentence may be processed by machine learning model A 412.

Each of messages 404 is processed by machine learning model A 412. Contextual embedding layer 414 generates an embedding for each word in each of messages 404. In generating an embedding for each word, contextual word embedding layer 414 may apply a contextual model to each of the strings included in messages 404. In examples, the contextual model that is applied may be a bidirectional encoder representations from transformers (BERT) model. In other examples, the contextual model may be a Sent2Vec model, Embeddings from Language Models (ELMo), and/or Recurrent Neural Networks model.

Distinct sentence aggregation layer 416 aggregates the embeddings for each word in messages 404 into a distinct embedding for each of the strings in messages 404. In aggregating the embeddings for each word, distinct sentence aggregation layer 416 may apply a neural network to the embeddings for each word. In examples, the neural network may comprise a gated recurrent unit (GRU) neural network or bi-GRU neural network. In other examples, the neural network may comprise a long short-term memory (LSTM) neural network.

Contextual sentence aggregation layer 418 aggregates each distinct embedding for each of the strings in messages 404 into a contextual embedding for each of the strings in messages 404. In aggregating the distinct embeddings for each string, contextual sentence aggregation layer 418 may apply a neural network to each distinct embedding for each of the strings in messages 404. In examples, the neural network may comprise a gated recurrent (GRU) neural network or bi-GRU neural network. In other examples, the neural network may comprise a long short-term memory (LSTM) neural network.

Sentence scoring layer 420 scores and ranks each of the strings in messages 404 based on their relevance to a location event intent and/or visit location intent. In scoring each of those strings, sentence scoring layer 420 may apply a classifier function to each contextual embedding for each of the plurality of strings (e.g., the embeddings generated by contextual sentence aggregation layer 418). In examples, the classifier function may comprise a sigmoid function. Other activation functions (e.g., tan h, softplus, etc.) may be utilized for scoring each sentence. In some examples, the model may be trained with a binary cross entropy loss using gold notated relevance scores. Other ways of training the model may include utilizing a margin-based hinge loss function.

According to examples, a threshold value may be utilized to determine which messages or natural language inputs to process by machine learning model B 426. For example, the values that are calculated for each of messages 404 (or strings in those messages) via sentence scoring layer 420 may be compared to a threshold value. If a string/message has a value that meets or exceeds the threshold value, that string/message may be processed by machine learning model B 426. If a string/message has a value that does not meet or exceed the threshold value, that string/message may not be processed further. The threshold value may be adjusted manually or automatically. For example, as machine learning model A 412 is trained, the threshold value may be lowered or increased. In this example, message 406\* and message 408\* have been determined to have met the minimum threshold and they are therefore sent to machine learning model B 426 for processing, as indicated by extracted strings 422.

Machine learning model B 426 includes entity extraction layer 428, entity classification layer 430, location control list augmentation layer 432, and anomaly detection layer 434. Entity extraction layer 428 may identify and/or extract entities that are relevant to a locational event intent and/or a visit location intent. Entity classification layer 430 may classify those entities by entity type (e.g., time, date, day of week, location, location type, etc.). Location control list augmentation layer 432 may augment a location control list, for a user account monitored by a group device monitoring service, with locational information extracted via entity extraction layer 428 and/or classified via entity classification layer 430. Anomaly detection layer 434 may determine whether a device associated with a user account monitored by a group device monitoring service is at a location at a time/date that is not included in a location control list for the user account.

If a determination is made by anomaly detection layer 434 that a device associated with a user account monitored by a group device monitoring service is at a location at a time/date that is not included in a location control list for the user account, alert engine 436 may cause an alert to be surfaced on a computing device associated with an administrator user of the corresponding group.

Figure 5:
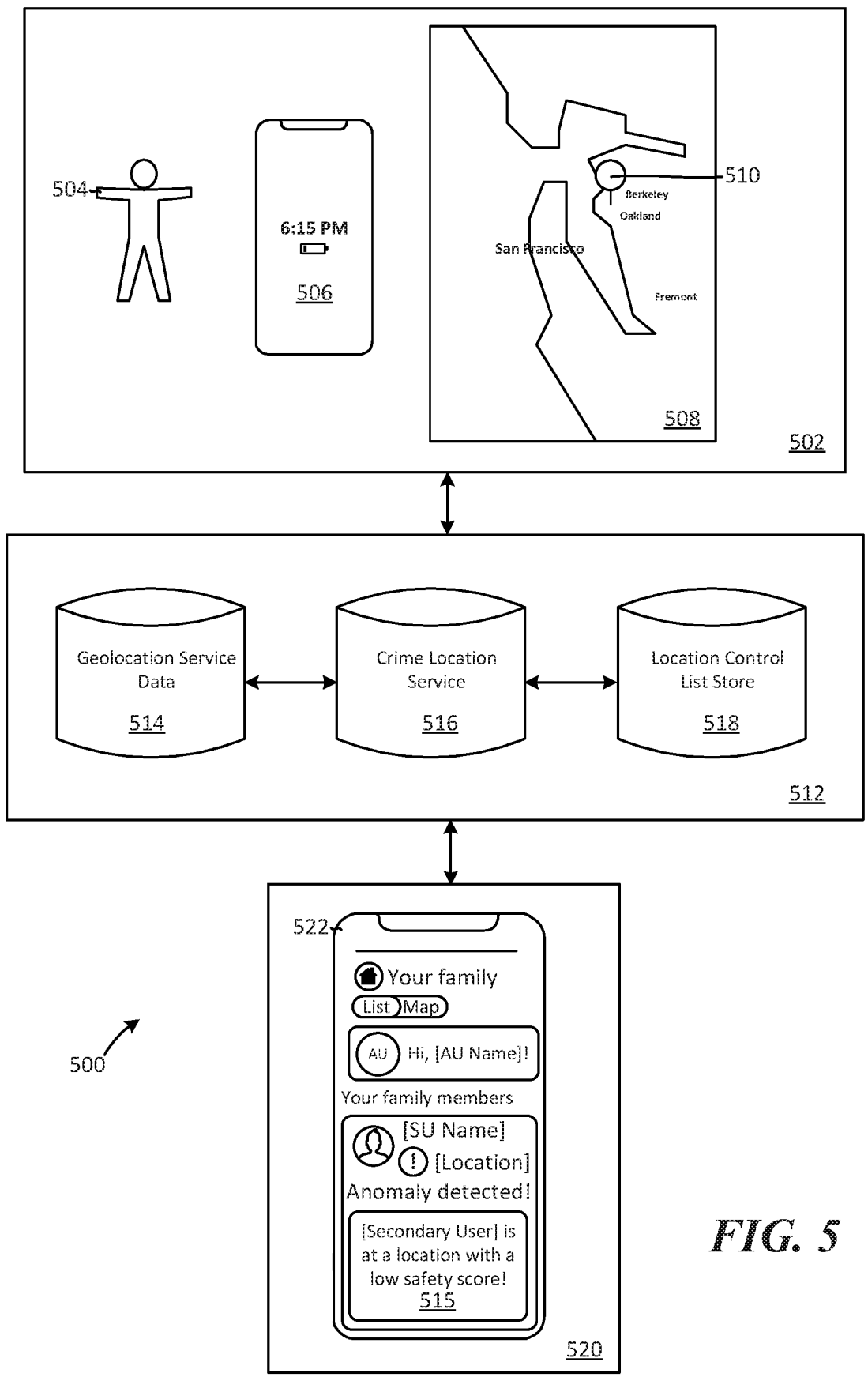
FIG. 5 is a schematic diagram illustrating an example distributed computing environment for augmenting group device monitoring alerts with locational safety metrics.

FIG. 5 is a schematic diagram illustrating an example distributed computing environment 500 for augmenting group device monitoring alerts with locational safety metrics. Computing environment 500 includes user tracking sub-environment 502, data store sub-environment 512, and anomaly alert sub-environment 520.

User tracking sub-environment 502 includes user 504, smartphone computing device 506, and user location 508. User 504 is associated with a user account that is monitored by a group device monitoring service. The user account is associated with computing device 506, which may provide its location to the group device monitoring service. The location may be sent periodically and/or when certain criteria are met (e.g., when a tracking application is open on computing device 506, when a map application is open on computing device 506, when computing device 506 accesses data from one or more services, etc.).

In this example, user 504, and computing device 506, are at location 510 in the Bay Area. Coordinates for the location may be identified via a GPS locator associated with computing device 506, cell tower triangulation, router IP address, etc. The coordinates may be identified via a geo-location data store, such as geolocation service data store 514. Geolocation service data store 514 may provide the coordinates to crime location service store 516, which may store historical crime data for various locations. In some examples, crime location service store 516 may store raw crime data with area identifiers for where the crimes occurred. In other examples, crime location service store 516 may process the crime data and generate safety scores (e.g., high safety score, medium safety score, low safety score) for various areas. In examples where crime location service store 516 only stores the raw crime data for areas, the group device monitoring service may analyze that data and generate safety scores for those areas based on the crime data.

In this example, the group device monitoring service determines that the location where user 504 is currently at (location 510) and/or the time or date when user 504 is at that location, is not included in a location control list for user 504 in location control list store 518. Further, the group device monitoring service, in association with crime location service store 516 and geolocation service data store 514, determines that there is a low safety score associated with location 510. As such, the group device monitoring service causes anomaly alert 515 to be surfaced on computing device 522. In some examples, an anomaly alert may be caused to be surfaced regardless of the safety score for a location if that location and/or the time the user is at the location is not in the location control list. In other examples, an anomaly alert may only be caused to be surfaced if a safety score for a location not in a location control list is below a certain threshold or score type (e.g., only for medium and low safety scores).

Computing device 522 is a computing device associated with an administrator user account of the group that includes user 504. Anomaly alert 515 states "[Secondary User] is at a location with a low safety score!" The list/map element on the top of the user interface displayed on computing device 522 may be interacted with to cause a map to display the location of computing device 506. In additional examples, the application displayed on computing device 522 may surface a selectable element for automatically contacting (e.g., texting, calling) computing device 506 when anomaly alert 515 is surfaced.

Figure 6:
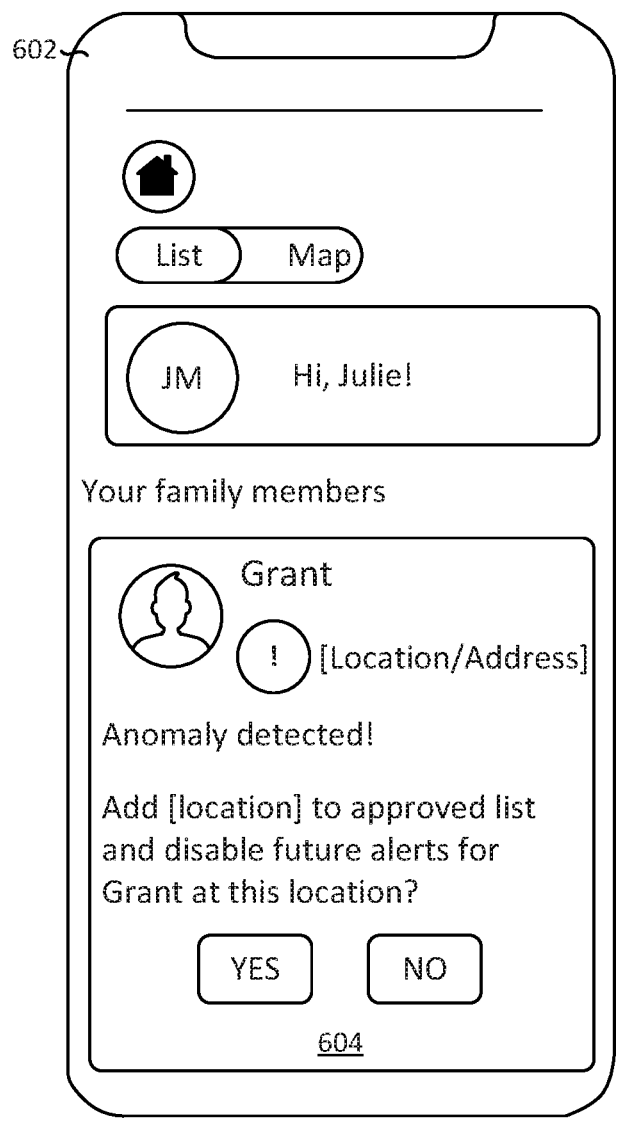
FIG. 6 illustrates a computing device surfacing an alert for a locational anomaly and a manual selection element for adding a location corresponding to the alert to a location control list.

FIG. 6 illustrates a computing device 602 surfacing an alert 604 for a locational anomaly and a manual selection element for adding a location corresponding to the alert to a location control list. Specifically, computing device 602 displays a group device monitoring application that is associated with the user of device 602. That user is Julie M. Alert 604 is for the user Grant. Alert 604 includes a location name and/or address of a location where Grant is currently at. Alert 604 also includes the text "Anomaly detected! Add [location] to approved list and disable future alerts for Grant at this location?" The selectable element "Yes" may be selected for adding the location where Grant currently is to his location control list, and therefore to the approved list of places Grant may go to without the administrator user (e.g., Julie M) receiving further notifications for that location for Grant. The selectable element "No" may be selected for leaving Grant's location control list as it is (e.g., not adding the location to his location control list). In some examples, if "Yes" is selected, the group device monitoring application may further prompt the administrator user whether to approve that location for all times and dates or only for certain times and dates.

Figure 7:
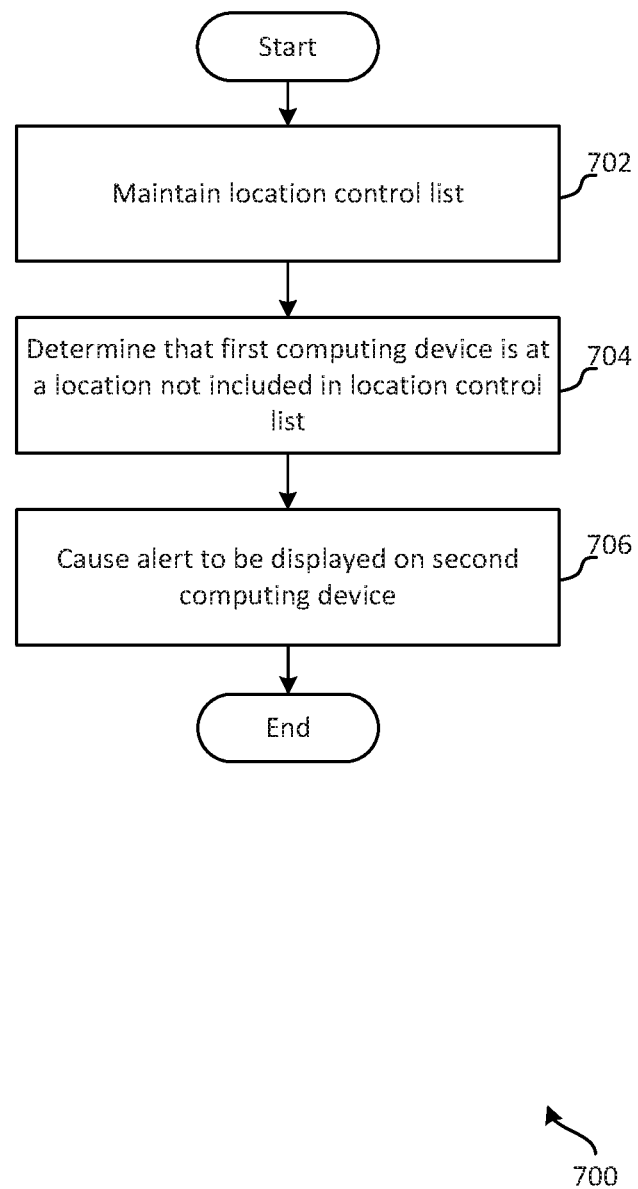
FIG. 7 is an exemplary method for providing location anomaly alerts from a group device monitoring service.

FIG. 7 is an exemplary method 700 for providing location anomaly alerts from a group device monitoring service. The method 700 begins at a start operation and flow moves to operation 702.

At operation 702 a location control list for a first user account associated with a group device monitoring service is maintained. The location control list may be associated with a specific user account of a group account. In some examples, the location control list may be associated with a specific user account of a family account. One or more of the user accounts of the group account may be administrator accounts and one or more of the user accounts of the group account may be secondary accounts. The administrator accounts may be able to approve or deny locations, dates, and/or times for being included in a location control list for a member of the group. The location control list may comprise an identity of a first computing device associated with the first user account. In additional examples, the location control list may comprise a plurality of location entries, at least one of the plurality of location entries added to the location control list based on an identified visitation pattern of the first computing device to a corresponding location. In additional examples, a first location entry of the plurality of location entries may comprise: first geocoordinates for a first location; a first time when the first computing device is approved for being at the first location; and a first day of a week when the first computing device is approved for being at the first location.

From operation 702 flow continues to operation 704 where a determination is made that the first computing device is at a second location at the first time and the first day of the week. That is, a determination may be made that the first computing device is at a location that is not included in the location control list for the first user account and/or that the first computing device is at a location at a time and/or date that is not included in the location control list for the user.

From operation 704 flow continues to operation 706 where an alert comprising an identity of the second location is caused to be displayed on a second computing device. The second computing device may be associated with a second user account associated with the group device monitoring service. In some examples, the second user account may be an administrator account. In other examples, the second user account may be a secondary user account. In some examples, the alert may include an indication of a safety score for the second location. The safety score may be identified from a crime and/or safety service.

From operation 706 flow moves to an end operation and the method 700 ends.

Figure 8:
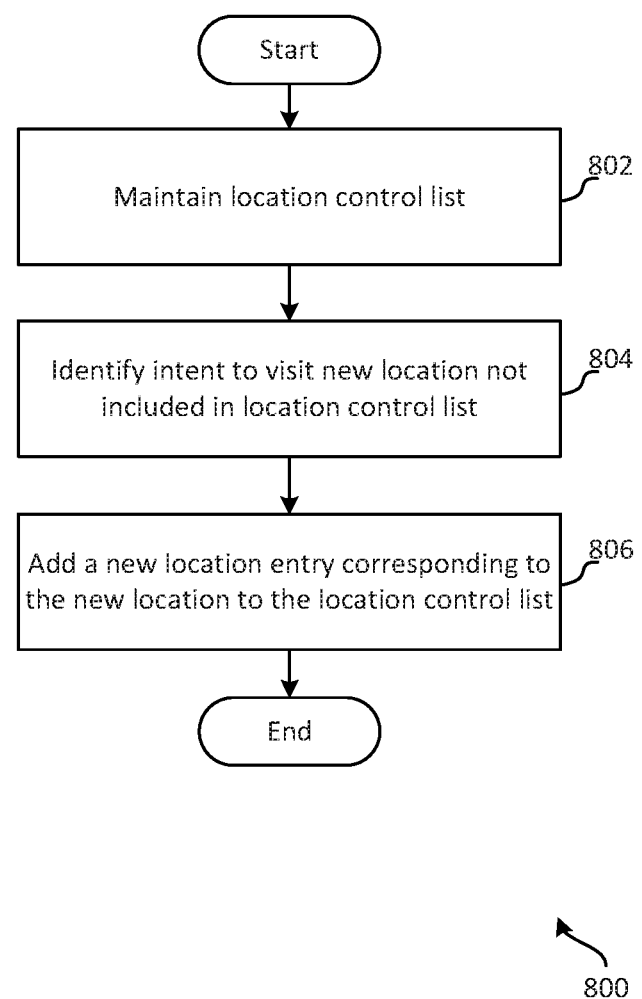
FIG. 8 is an exemplary method for dynamically modifying a location control list associated with a group device monitoring service.

FIG. 8 is an exemplary method 800 for dynamically modifying a location control list associated with a group device monitoring service. The method 800 begins at a start operation and flow moves to operation 802.

At operation 802 a location control list for a first user account associated with a group device monitoring service is maintained. The first user account may be an administrator user account of a group account or a secondary user account of a group account. The location control list may comprise an identity of a first computing device associated with the first user account. The location control list may comprise a plurality of location entries, at least one of the plurality of location entries added to the location control list based on an identified visitation pattern of the first computing device to a corresponding location. For example, a location and/or date or time associated with a location may be added to an action control list for a user account if a device associated with that user account is identified as being at that location at the time and/or date a threshold number of times and/or a threshold number of times over a threshold duration of time.

From operation 802 flow continues to operation 804 where an intent to visit a new location at a first time and a first date is identified from data from a software application associated with the first user account. The new location is not included in one of the plurality of location entries of the location control list. The identification may comprise applying a machine learning model and/or a language processing model to the application data. The software application may comprise a calendar application, an email application, a word processing application, a task management application, a to-do list application, and/or a messaging application, for example.

From operation 804 flow moves to operation 806 where a new location entry is added to the location control list. The new location entry may comprise an identity of the new location. The new location entry may further comprise geocoordinates of the new location. In additional examples, the new location entry may further comprise the first time and/or the first date.

From operation 806 flow moves to an end operation and the method 800 ends.

Figure 9:
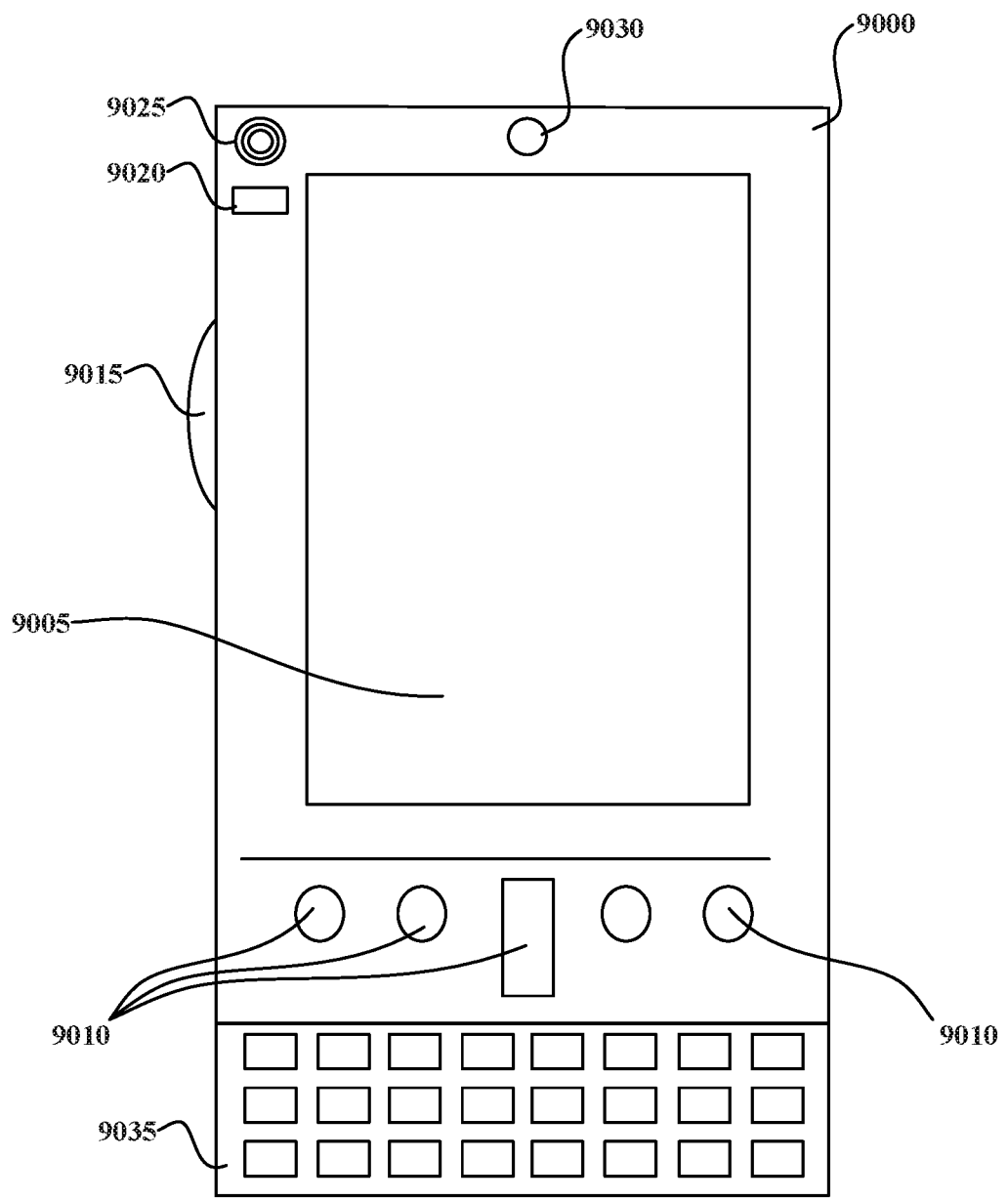
FIGS. 9 and 10 are simplified diagrams of a mobile computing device with which aspects of the disclosure may be practiced.
Figure 10:
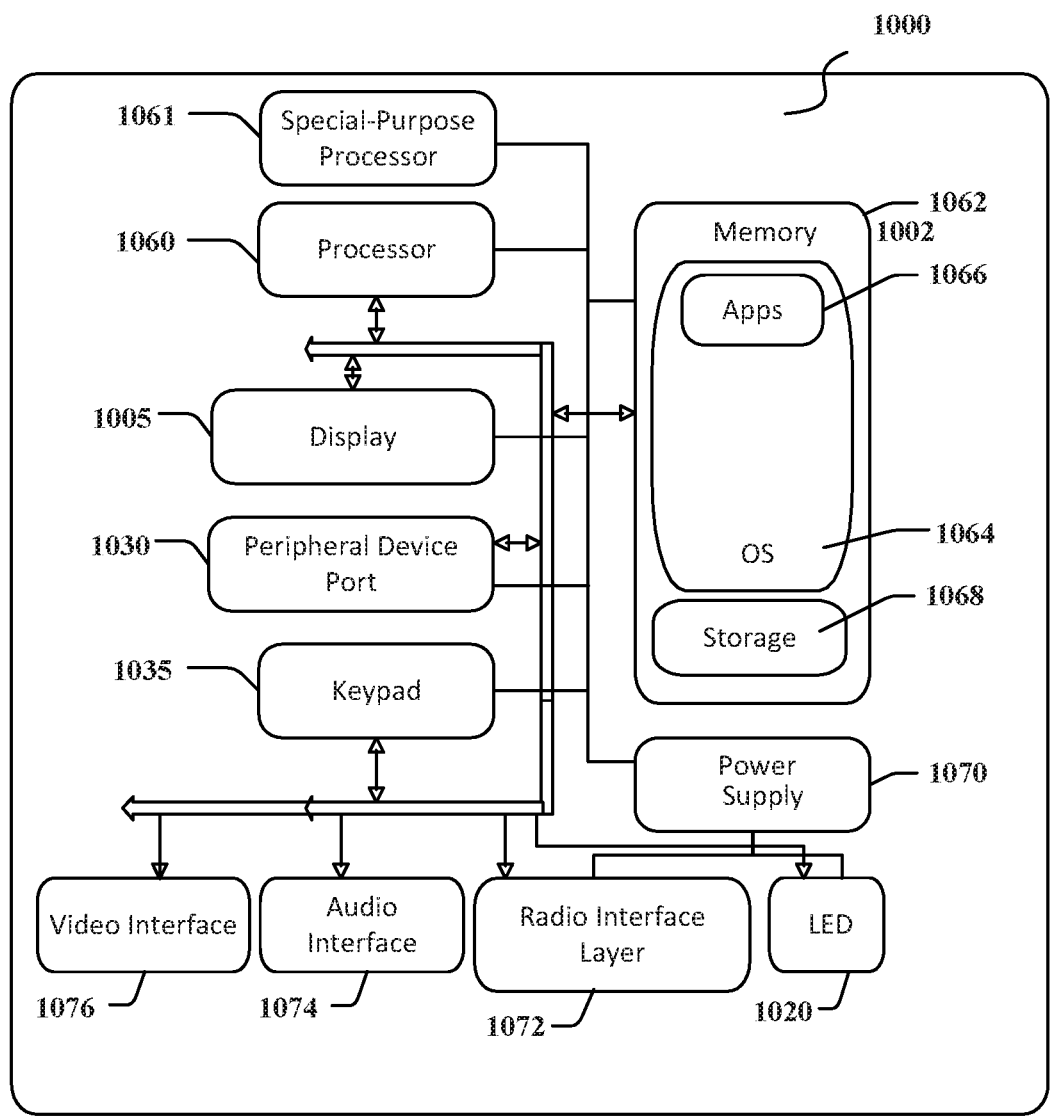

FIGS. 9 and 10 illustrate a mobile computing device 900, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 9, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or fewer input elements. For example, the display 905 may not be a touch screen in some embodiments. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 10 is a block diagram illustrating the architecture of one aspect of a mobile computing device. That is, the mobile computing device 1000 can incorporate a system (e.g., an architecture) 1002 to implement some aspects. In one embodiment, the system 1002 is implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000, including instructions for providing and operating a group device monitoring platform.

The system 1002 has a power supply 1070, which may be implemented as one or more batteries. The power supply 1070 might further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 920 may be used to provide visual notifications, and/or an audio interface 1074 may be used for producing audible notifications via the audio transducer 925. In the illustrated embodiment, the visual indicator 920 is a light emitting diode (LED) and the audio transducer 925 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 925, the audio interface 1074 may also be coupled to a microphone to receive audible input, such as to facilitate a telephone conversation. In accordance with embodiments of the present disclosure, the microphone may also serve as an audio sensor to facilitate control of notifications, as will be described below. The system 1002 may further include a video interface 1076 that enables an operation of an on-board camera 930 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10 by the non-volatile storage area 1068.

Data/information generated or captured by the mobile computing device 1000 and stored via the system 1002 may be stored locally on the mobile computing device 1000, as described above, or the data may be stored on any number of storage media that may be accessed by the device via the radio interface layer 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1072 or via a distributed computing network. Similarly, such data/information may be readily transferred between computing devices for storage and use according to well-known data/information transfer and storage means, including electronic mail and collaborative data/information sharing systems.

Figure 11:
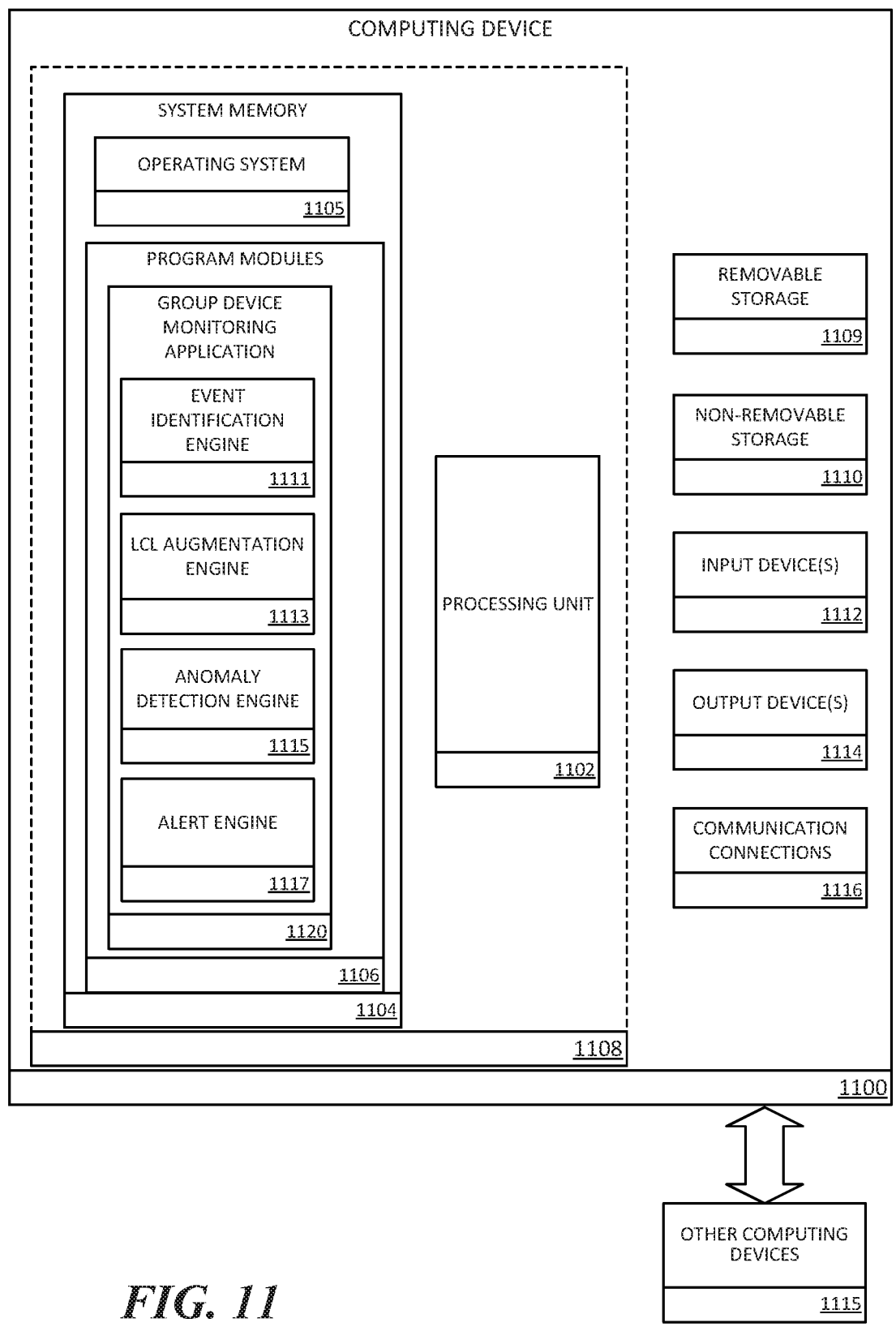
FIG. 11 is a block diagram illustrating example physical components of a computing device with which aspects of the disclosure may be practiced.

FIG. 11 is a block diagram illustrating physical components (e.g., hardware) of a computing device 1100 with which aspects of the disclosure may be practiced. The computing device components described below may have computer executable instructions for performing operations associated with a group device monitoring service as described herein. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 suitable for running one or more digital assistant programs. The operating system 1105, for example, may be suitable for controlling the operation of the computing device 1100. Furthermore, embodiments of the disclosure may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106 (e.g., group device monitoring application 1120) may perform processes including, but not limited to, the aspects, as described herein. According to examples, event identification engine 1111 may perform one or more operations associated with applying one or more machine learning and/or natural language processing models to application data and identifying locational events from that data. LCL augmentation engine 1113 may perform one or more operations associated with adding information from identified locational events to a location control list associated with a user account monitored by a group device monitoring service. Anomaly detection engine 1115 may perform one or more operations associated with identifying a locational and/or temporal anomaly associated with a user's computing device (e.g., identifying that a user is located at a location and/or at a location at a particular time that does not correspond to an entry in a location control list for that user). Alert engine 1117 may perform one or more operations associated with causing an alert to be surfaced on one or more group devices monitored by a group device monitoring service when one of the devices is determined to be at a location and/or at a location at a time/date that is not included in a location control list for a corresponding user.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1100 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1100 may also have one or more input device(s) 1112 such as a keyboard, a mouse, a pen, a sound or voice input device, a touch or swipe input device, etc. The output device(s) 1114 such as a display, speakers, a printer, etc. may also be included. The aforementioned devices are examples and others may be used. The computing device 1100 may include one or more communication connections 1116 allowing communications with other computing devices 1150. Examples of suitable communication connections 1116 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal. Computer storage device does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 12:
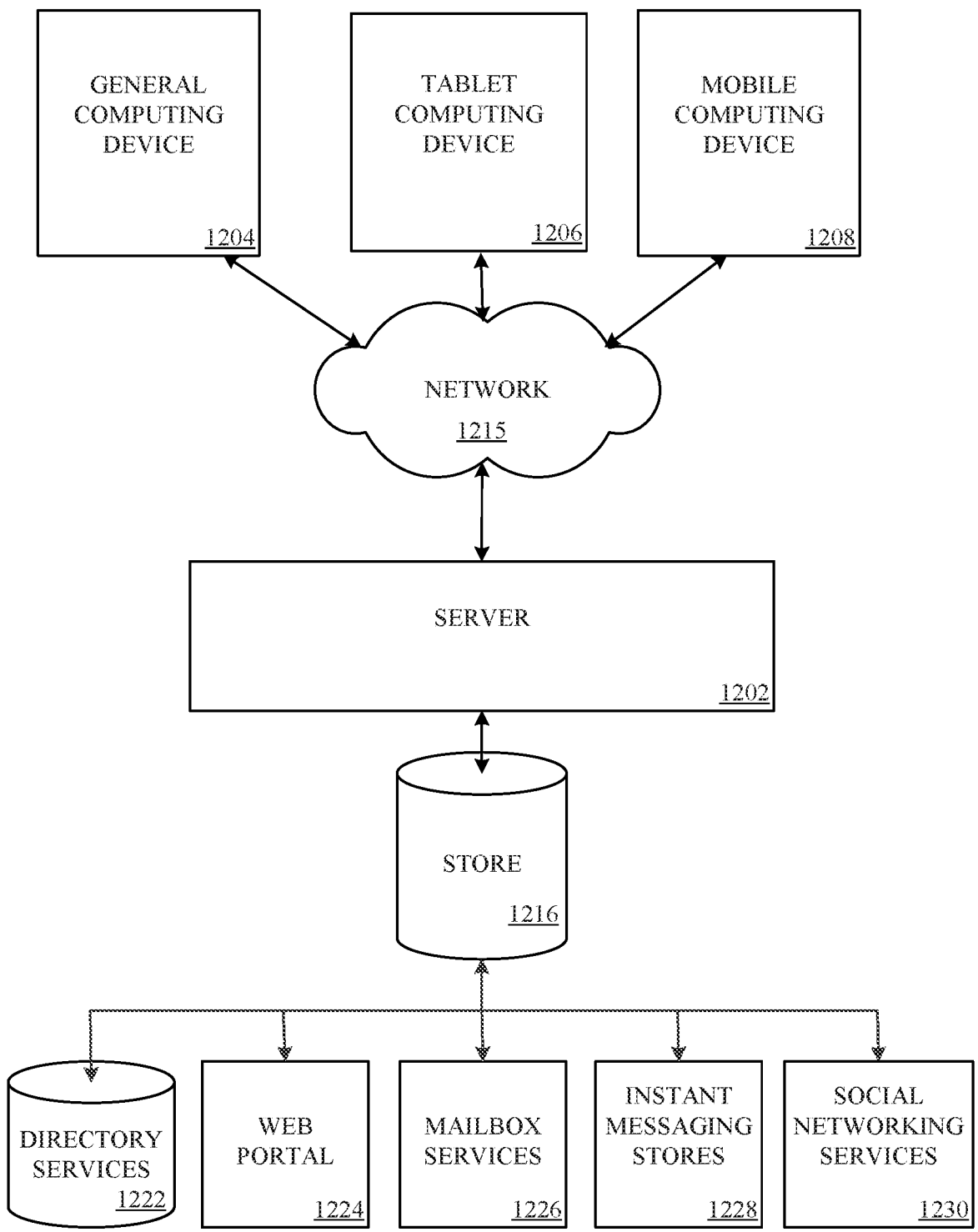
FIG. 12 is a simplified block diagram of a distributed computing system in which aspects of the present disclosure may be practiced.

FIG. 12 illustrates one aspect of the architecture of a system for processing data received at a computing system from a remote source, such as a personal/general computer 1204, tablet computing device 1206, or mobile computing device 1208, as described above. Content displayed at server device 1202 may be stored in different communication channels or other storage types. For example, various documents may be stored using a directory service 1222, a web portal 1224, a mailbox service 1226, an instant messaging store 1228, or a social networking site 1230. The program modules 1106 may be employed by a client that communicates with server device 1202, and/or the program modules 1106 may be employed by server device 1202. The server device 1202 may provide data to and from a client computing device such as a personal/general computer 1204, a tablet computing device 1206 and/or a mobile computing device 1208 (e.g., a smart phone) through a network 1215. By way of example, the computer systems described herein may be embodied in a personal/general computer 1204, a tablet computing device 1206 and/or a mobile computing device 1208 (e.g., a smart phone). Any of these embodiments of the computing devices may obtain content from the store 1216, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for providing anomaly alerts, the computer-implemented method comprising:
   maintaining a location control list for a first user account associated with a group device monitoring service, the location control list comprising:
      an identity of a first computing device associated with the first user account;
      a plurality of location entries, at least one of the plurality of location entries added to the location control list based on an identified visitation pattern of the first computing device to a corresponding location, and at least one of the plurality of location entries manually added to the location control list by an administrator user account;
      a first location entry of the plurality of location entries, the first location entry comprising:
         first geocoordinates for a first location;
         a first time when the first computing device is approved for being at the first location; and
         a first day of a week when the first computing device is approved for being at the first location;
   determining that the first computing device is at a second location at the first time and the first day of the week;
   causing an alert comprising an identity of the second location and a selectable element for adding the second location to the location control list to be displayed on a second computing device, wherein the second computing device is associated with the administrator user account;
   receiving a selection of the selectable element for adding the second location to the location control list; and
   adding the second location to the location control list.

2. The computer-implemented method of claim 1, further comprising:
   identifying, from data from a productivity application associated with the first user account, an intent to visit a new location at a second time and a second date, wherein the new location is not included in one of the plurality of location entries; and
   adding a new location entry corresponding to the new location to the location control list.

3. The computer-implemented method of claim 2, wherein the new location entry comprises:
   an identity of the new location;
   geocoordinates of the new location;
   the second time; and
   the second date.

4. The computer-implemented method of claim 2, wherein identifying the intent to visit the new location comprises:
   applying a sentence attention model to the data from the productivity application.

5. The computer-implemented method of claim 2, wherein the sentence attention model has been trained to identify strings that are related to visiting locations.

6. The computer-implemented method of claim 2, wherein the data from the productivity application comprises one of: a calendar event entry; an SMS message, and an email.

7. The computer-implemented method of claim 2, further comprising:
   determining that the first computing device is at the new location at the second time and the second date; and
   causing an indication that the first computing device is at a location corresponding to a location entry in the location control list to be surfaced on the second computing device.

8. The computer-implemented method of claim 1, further comprising:

determining that the first computing device has visited a new location at a second time and a second day of a week a threshold number of times; and adding the new location to the location control list in a new location entry.

9. The computer-implemented method of claim 1, further comprising:

sending second geolocation coordinates for the second location to a crime map service;

receiving crime data for a geographic area corresponding to the geolocation coordinates.

10. The computer-implemented method of claim 9, further comprising:

determining a safety metric for the second location from the crime data for the geographic area; and causing an indication of the safety metric to be displayed with the alert on the second computing device.

11. A computer-readable storage device comprising executable instructions that, when executed by a processor, assists with providing anomaly alerts, the computer-readable storage device including instructions executable by the processor for:

maintaining a location control list for a first user account associated with a group device monitoring service, the location control list comprising:
 an identity of a first computing device associated with the first user account;
 a plurality of location entries, at least one of the plurality of location entries added to the location control list based on an identified visitation pattern of the first computing device to a corresponding location, and at least one of the plurality of location entries manually added to the location control list by an administrator user account;
 a first location entry of the plurality of location entries, the first location entry comprising:
  first geocoordinates for a first location;
  a first time when the first computing device is approved for being at the first location; and
  a first day of a week when the first computing device is approved for being at the first location;

determining that the first computing device is at a second location at the first time and the first day of the week;

causing an alert comprising an identity of the second location and a selectable element for adding the second location to the location control list to be displayed on a second computing device, wherein the second computing device is associated with the administrator user account;

receiving a selection of the selectable element for adding the second location to the location control list; and adding the second location to the location control list.

12. The computer-readable storage device of claim 11, wherein the instructions are further executable by the processor for:

identifying, from data from a productivity application associated with the first user account, an intent to visit a new location at a second time and a second date, wherein the new location is not included in one of the plurality of location entries; and adding a new location entry corresponding to the new location to the location control list.

13. The computer-readable storage device of claim 12, wherein the new location entry comprises:

an identity of the new location;
geocoordinates of the new location;
the second time; and
the second date.

14. The computer-readable storage device of claim 12, wherein in identifying the intent to visit the new location, the instructions are further executable by the processor for:

applying a sentence attention model to the data from the productivity application.

15. The computer-readable storage device of claim 12, wherein the instructions are further executable by the processor for:

determining that the first computing device is at the new location at the second time and the second date; and causing an indication that the first computing device is at a location corresponding to a location entry in the location control list to be surfaced on the second computing device.

16. The computer-readable storage device of claim 11, wherein the instructions are further executable by the processor for:

determining that the first computing device has visited a new location at a second time and a second day of a week a threshold number of times; and adding the new location to the location control list in a new location entry.

17. A system comprising:

a memory for storing executable program code; and a processor, functionally coupled to the memory, the processor being responsive to computer-executable instructions contained in the program code and operative to:

maintain a location control list for a first user account associated with a group device monitoring service, the location control list comprising:
 an identity of a first computing device associated with the first user account,
 a plurality of location entries, at least one of the plurality of location entries added to the location control list based on an identified visitation pattern of the first computing device to a corresponding location, and at least one of the plurality of location entries manually added to the location control list by an administrator user account,
 a first location entry of the plurality of location entries, the first location entry comprising:
  first geocoordinates for a first location,
  a first time when the first computing device is approved for being at the first location, and
  a first day of a week when the first computing device is approved for being at the first location;

determine that the first computing device is at a second location at the first time and the first day of the week;

determine that a user corresponding to the first user account is within a threshold distance at the second location of a user corresponding to the administrator user account; and suppress, based on the determination that the user corresponding to the first user account is within the threshold distance at the second location of the user corresponding to the administrator user account, an alert from being surfaced.

18. The system of claim 17, wherein the processor is further responsive to the computer-executable instructions contained in the program code and operative to:

identify, from data from a productivity application associated with the first user account, an intent to visit a new location at a second time and a second date, wherein the new location is not included in one of the plurality of location entries; and add a new location entry corresponding to the new location to the location control list.

19. The system of claim 18, wherein the new location entry comprises:
 an identify of the new location;
 geocoordinates of the new location;
 the second time; and
 the second date.

20. The system of claim 18, wherein in identifying the intent to visit the new location, the processor is further responsive to the computer-executable instructions contained in the program code and operative to:
 apply a sentence attention model to the data from the productivity application.

\* \* \* \* \*